Patented Dec. 8, 1925.

1,564,262

UNITED STATES PATENT OFFICE.

HOWARD S. MELLOTT, OF MORENCI, MICHIGAN.

FOOD MANUFACTURE.

No Drawing.　　Application filed December 16, 1922. Serial No. 607,425.

*To all whom it may concern:*

Be it known that I, HOWARD S. MELLOTT, a citizen of the United States of America, residing at Morenci, Lenawee County, Michigan, have invented a new and useful Food Manufacture, of which the following is a specification.

This invention relates to food products and their manufacture.

This invention has utility as a milk or other food ration as a body in a prepared food which may be kept at hand for ready use to be made into a confection, to be incorporated in culinary emergency or regularly for icings for cakes, in puddings, congealed for ice cream, dissolved or rather diluted with hot water, or even milk, for use as a beverage.

In the carrying out of this invention, the body may be of cereal or vegetable base, but is herein described as more particularly a milk base. The problems for maintenance of smooth texture, good appearance, appetizing taste, preserved against deterioration, open with a milk base as the body of the food ration a most wide range of food uses. The body is preferably built up to a solid content, say of a minimum of 25.5% solids, which with whole milk would include fat, and solids not fat of casein, milk sugar, albumin, and mineral salts or ash.

As a ready prepared food, body is given over above, and the entire product preserved. Effective sterilization is important, and the groundwork therefor it is found is well taken when the body is given to whole milk by concentrating at a high temperature by rapidly moving a thin layer uniformly for a brief interval of time over a highly heated surface, the temperature of such surface being such that milk adhering thereto would tend to burn. An apparatus for effecting such concentrating of the milk is shown in U. S. Letters Patent No. 1,420,647 June 27, 1922.

For a plain ice cream mixture, the hot milk, as thus concentrated to the above solid content region, is homogenized, preferably at a pressure of about 1,000 lbs. The product is then cooled to approximately 50° F., and sugar to approximately 16.5% by weight is stirred into the cool liquid until the sugar is thoroughly dissolved thereinto.

This cooled sweetened mass is filled into containers, as small cans for domestic use, and larger cans or containers for restaurant or hotel use, and sealed thereinto against the atmosphere. As so sealed up, the containers are introduced into a sterilizer for shifting or agitation during warming up and the sterilization interval. The sweetening makes the substance in the container of lower viscosity, and the sweetening, cocoa or chocolate, if any, and the fat are poor conductors of heat. In effecting sterilization it is important that the sterilization temperature be uniform throughout the entire contents of each container. To insure effective sterilization of this heavier body which includes the insulating ingredients of sugar and fat, the joltings or travel rate of the shifting container is increased to splash or move the container contents continually as to the container walls. The warmed ingredients against the side walls have less specific gravity and are readily displaced in the lower portions of the container by the cooler central portions, while as the container is continually oriented by the rotating or drum type of sterilizer, a uniform heating is obtained.

In the instance of producing a smooth condensed milk, it is brought up to the warming temperature during the operation of the sterilizer say at 10 R. P. M., with the drum of 4' diameter type. When attaining say 240° F., such temperature may be held say 20 min. at 10 R. P. M. If the temperature be increased, the temperature at which held for sterilizing may be for a shorter time interval, and with the higher temperature slight increase in speed may be in order. The period to warm is shorter for small cans—say pounds, than for gallons. Increase in speed at a temperature and for a sterilizing time interval, tends to shake out the solids. Increase in time interval at a temperature, or increase in temperature, each means excessive heating with tendency of the mineral salts to separate out as granular material.

The concentrated milk as herein disclosed, traveling at high speed during moisture removal, seems to have heat resistance notwithstanding the solid content proportion, and as above homogenized and sweetened, is resistant to breaking down of the ingredients thereof in a sealed container during sterilization, which sterilization is conducted with a vigor as to heat and agitation destructive to smooth milk. With lower viscosity substance, were the agitation not severe in the sterilizer, there would be an excessive heating of the portions of the substance in the container adjacent the container walls, resulting in a breaking down of the uniform character of the mass, to the detriment of the product as a preserved prepared food.

Flavors may be added as the prepared food is used. This substance as sterilized, is at once cooled. It may be placed upon the market similarly to canned milk, and as handled by merchants, may be purchased by the consumer and by congealing in a freezer, plain ice cream is had.

The prepared product may itself carry the flavor, or have added body, in which latter event the heat stability of the milk is of increased importance. The flavor is preferably incorporated before homogenizing. The body may be built up with chocolate with the cocoa butter contributing to the body and the chocolate to the flavor. Instead of chocolate, cocoa may be used alone. To increase the fat body, there may be additional animal fat beyond the butter fat of the milk, as by a hydrogenated vegetable oil. Cocoanut oil as added at this time, as well as any other body or flavor imparting ingredients, are with the warm milk homogenized, and the sweetening thereafter added. The lower heat penetration of the product due to the added fat, sugar, chocolate or cocoa, must be met and its insulation action broken down by the vigorous agitation at high temperature of sterilization.

The homogenizer is effective to disseminate the fats. The later added sugar besides contributing palatability and food value, has preservative action.

By building up the solid content of the milk in concentration, such content may bring the solids to say 25.5%. By stirring sugar thereinto after homogenizing to 16½% by weight, this solid content is brought up to 42%. When vegetable fat or chocolate solids, or cocoa as a chocolate product, is added the solids may be built up to 55% or even greater. Inasmuch as whole milk is taken, the fat content therefrom, even in the 42% solid product, will run about 7.8%. With skim milk, all the fat may be separately added or the fat may be from vegetable source or chocolate. Such fat content of the mass may be still further increased or decreased as desired. Due to the mode of handling as herein disclosed, applicant has succeeded in working effective sterilization and the product is new and one which has great range of food possibilities and commercial value.

In the food hereunder the addition of the sugar after homogenizing occurs is a factor not only permitting a higher temperature for sterilizing but making sterilizing practicable. Furthermore, the flavor of the product in sweetening afterwards produces a product of palatability comparable with fresh products even though not sterilized.

What is claimed and it is desired to secure by Letters Patent is:

1. A process of preparing a food product which comprises concentrating milk, adding chocolate flavor thereto, warming the resultant mixture and homogenizing while warm, cooling said mixture and adding sweetening material to the same, the resultant product being subsequently sealed in a container and sterilized with heat and agitation.

2. A process of preparing a food product which comprises effecting rapid travel of milk as to a surface heated above 212° F., adding a thick water solution of chocolate flavor thereto while still warm, homogenizing the warm mixture, cooling said mixture, and stirring sugar thereinto until fully dissolved, the resultant product being sealed in a container and sterilized.

3. A process of preparing a food product which comprises rapidly moving a thin layer of milk as to a surface of a temperature above 212° F., mixing cocoa and vegetable fat therewith, homogenizing, sweetening, exposing to a sterilizing temperature above 200° F., and shifting to break down heat insulation tendencies of the sweet and fat ingredients for effectively sterilizing uniformly the whole mass.

4. A process of preparing a food product which comprises rapidly moving a thin layer of milk as to a surface maintained at a temperature above 200°F., mixing cocoa therewith, homogenizing while still warm, cooling, sweetening by working sugar thereinto until fully dissolved, sealing in a container, exposing to a sterilizing temperature tending to break down ingredients resting undisturbed against a container wall, and shifting the container for such agitation of the container contents as to effect uniform sterilization.

5. A process of preparing a food product which comprises effecting continuous uniform travel of a thin layer of milk as to a surface of a temperature above 212° F., flavoring with a chocolate, increasing the body over milk by the addition of a fat, homogenizing, stirring sugar to dissolve thereinto, sealing against atmospheric contamination, and sterilizing with accompanying agitation at temperature and shifting rates with time interval function.

6. A water soluble sterilized homogenous liquid food product embodying milk solids, vegetable solids including chocolate, and sweetening in excess of thirty-five percent by weight.

7. A water soluble homogeneous liquid sterilized milk product including a chocolate, the solids of said product being in excess of thirty-five percent.

In witness whereof I affix my signature.

HOWARD S. MELLOTT.